(12) United States Patent
Mano et al.

(10) Patent No.: US 10,283,980 B2
(45) Date of Patent: May 7, 2019

(54) ELECTRICAL STORAGE SYSTEM

(71) Applicant: TOYOTA JIDOSHA KABUSHIKI KAISHA, Toyota-shi, Aichi-ken (JP)

(72) Inventors: Ryo Mano, Toyota (JP); Teruo Ishishita, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 136 days.

(21) Appl. No.: 15/103,104

(22) PCT Filed: Dec. 10, 2014

(86) PCT No.: PCT/IB2014/002716
§ 371 (c)(1),
(2) Date: Jun. 9, 2016

(87) PCT Pub. No.: WO2015/087141
PCT Pub. Date: Jun. 18, 2015

(65) Prior Publication Data
US 2016/0380450 A1 Dec. 29, 2016

(30) Foreign Application Priority Data
Dec. 11, 2013 (JP) ................................ 2013-256546

(51) Int. Cl.
*H02J 7/00* (2006.01)
*H02J 7/14* (2006.01)
*H02J 7/02* (2016.01)

(52) U.S. Cl.
CPC ............ *H02J 7/0029* (2013.01); *H02J 7/007* (2013.01); *H02J 7/027* (2013.01); *H02J 2007/0037* (2013.01); *H02J 2007/0039* (2013.01)

(58) Field of Classification Search
USPC ....... 320/134, 135, 136, 137, 107, 150, 116, 320/128, 154, 103, 109, 122, 162
See application file for complete search history.

(56) References Cited

U.S. PATENT DOCUMENTS 6,001,497 A * 12/1999 Okutoh ................. H01M 10/42
320/134
6,486,637 B1 * 11/2002 Nakanishi ........... B60L 11/1866
320/150
(Continued)

FOREIGN PATENT DOCUMENTS

| CN | 102859836 A | 1/2013 |
|----|-------------|--------|
| JP | 2004-023949 A | 1/2004 |

(Continued)

*Primary Examiner* — Alexis B Pacheco
(74) *Attorney, Agent, or Firm* — Sughrue Mion, PLLC

(57) ABSTRACT

When a voltage value of an electrical storage device becomes higher than a predetermined voltage value for identifying an overcharged state of the electrical storage device, calculation of a heat generation amount of the electrical storage device based on a current value is started. When the calculated heat generation amount is larger than a predetermined amount, it is determined that the electrical storage device is in an abnormal state (abnormal state related to heating). Because the electrical storage device enters an easily heated state when the voltage value becomes higher than the predetermined voltage value, the heat generation amount may be monitored by starting calculation of the heat generation amount. Once the voltage value becomes higher than the predetermined voltage value, irrespective of a high/low relationship between the voltage value and the predetermined voltage value, the abnormal state may be determined by monitoring the heat generation amount.

3 Claims, 3 Drawing Sheets

(56) References Cited

U.S. PATENT DOCUMENTS

| | | | | |
|---|---|---|---|---|
| 2003/0118891 | A1* | 6/2003 | Saito | B60L 1/003 |
| | | | | 429/62 |
| 2008/0211309 | A1* | 9/2008 | Nolte | H02J 7/0045 |
| | | | | 307/66 |
| 2009/0153100 | A1* | 6/2009 | Okumura | H02J 7/0026 |
| | | | | 320/116 |
| 2009/0202889 | A1* | 8/2009 | Mori | H01M 10/443 |
| | | | | 429/62 |
| 2012/0022708 | A1 | 1/2012 | Higuchi et al. | |
| 2012/0299537 | A1* | 11/2012 | Kikuchi | H02J 7/0091 |
| | | | | 320/107 |
| 2013/0049679 | A1* | 2/2013 | Mukai | H01H 85/046 |
| | | | | 320/107 |
| 2013/0181681 | A1* | 7/2013 | Mukai | H02J 7/0031 |
| | | | | 320/134 |
| 2013/0181682 | A1* | 7/2013 | Yoshioka | H01G 11/14 |
| | | | | 320/134 |
| 2014/0340046 | A1* | 11/2014 | Komori | H01M 2/34 |
| | | | | 320/134 |

FOREIGN PATENT DOCUMENTS

| | | |
|---|---|---|
| JP | 2006-187117 A | 7/2006 |
| JP | 2009-081958 A | 4/2009 |
| JP | 2010-239835 A | 10/2010 |

* cited by examiner

ELECTRICAL STORAGE SYSTEM

BACKGROUND OF THE INVENTION

1. Field of the Invention

The invention relates to an electrical storage system that determines whether an electrical storage device is in an abnormal state related to heating.

2. Description of Related Art

Japanese Patent Application Publication No. 2006-187117 (JP 2006-187117 A) describes that, when the voltage value of a battery exceeds an overcharge reference voltage, an overcharge flag is set to an on state. When the overcharge flag is set to the on state, a time (duration) during which the overcharge flag is continuously set in the on state is counted. When the duration has reached a determination time, it is determined that the battery is in an overcharged state. When the battery is in the overcharged state, charging or discharging of the battery is stopped.

On the other hand, when the voltage value of the battery becomes lower than the overcharge reference voltage, the overcharge flag is set to an off state. When the voltage value of the battery exceeds the overcharge reference voltage again, the overcharge flag is set to the on state, and the duration of the on state of the overcharge flag is counted anew.

SUMMARY OF THE INVENTION

In JP 2006-187117 A, the voltage value of the battery may become lower than the overcharge reference voltage before the duration reaches the determination time. Particularly, when the battery is discharged, a voltage drop according to a current value and the internal resistance of the battery occurs. In such a case, the voltage value of the battery tends to become lower than the overcharge reference voltage. At this time, it is not determined that the battery is in the overcharged state. As a result, a determination of the overcharged state of the battery delays.

When the voltage value of the battery exceeds the overcharge reference voltage, the battery enters an easily heated state. For example, heat is generated by oxidative destruction, or the like, of an electrolytic solution contained in the battery, and the battery enters the easily heated state. Therefore, a heat generation amount of the battery at the time when the voltage value exceeds the overcharge reference voltage is larger than a heat generation amount of the battery at the time when the voltage value remains lower than the overcharge reference voltage. Even when the voltage value exceeds the overcharge reference voltage and then becomes lower than the overcharge reference voltage, the battery is still in the easily heated state.

As described above, as a determination of the overcharged state of the battery delays, the easily heated state of the battery tends to continue. Thus, there is a concern that the temperature of the battery excessively increases before it is determined that the battery is in the overcharged state.

An aspect of the invention provides an electrical storage system. The electrical storage system includes an electrical storage device, a voltage sensor, a current sensor and a controller. The voltage sensor is configured to detect a voltage value of the electrical storage device. The current sensor is configured to detect a current value of the electrical storage device. The controller is configured to start calculation of a heat generation amount of the electrical storage device based on the current value, when the voltage value of the electrical storage device becomes higher than a predetermined voltage value. The predetermined voltage value is used to identify an overcharged state of the electrical storage device. The controller is configured to determine that the electrical storage device is in an abnormal state, when the calculated heat generation amount is larger than a predetermined amount. The abnormal state is an abnormal state related to heating of the electrical storage device.

When the voltage value of the electrical storage device becomes higher than the predetermined voltage value, the electrical storage device enters an easily heated state. Therefore, by starting calculation of the heat generation amount of the electrical storage device at the time when the voltage value becomes higher than the predetermined voltage value, it is possible to continue monitoring the heat generation amount of the electrical storage device. Once the voltage value becomes higher than the predetermined voltage value, irrespective of a high/low relationship between the voltage value and the predetermined voltage value, the heat generation amount of the electrical storage device is monitored. Thus, it is possible to determine whether the electrical storage device is in the abnormal state on the basis of the heat generation amount of the electrical storage device.

In the above aspect, the controller may be configured to calculate the heat generation amount in a period during which the voltage value becomes higher than the predetermined voltage value and then becomes lower than or equal to the predetermined voltage value and a duration of the voltage value lower than or equal to the predetermined voltage value reaches a predetermined time. As the duration of the voltage value lower than or equal to the predetermined voltage value extends, the electrical storage device becomes more likely to exit from the easily heated state. Therefore, by determining whether the duration is longer than or equal to the predetermined time, it is determined whether the electrical storage device has exited from the easily heated state.

In the above aspect, the controller may be configured to set the calculated heat generation amount to zero when the voltage value becomes higher than the predetermined voltage value and then becomes lower than or equal to the predetermined voltage value and a duration of the voltage value lower than or equal to the predetermined voltage value is longer than or equal to a predetermined time. When the electrical storage device has exited from the easily heated state, an excessive increase in the temperature of the electrical storage device is suppressed. Therefore, it is not required to monitor the heat generation amount of the electrical storage device. In the period during which the voltage value of the electrical storage device becomes higher than the predetermined voltage value and then becomes lower than or equal to the predetermined voltage value and the duration of the voltage value lower than or equal to the predetermined voltage value reaches the predetermined time, the heat generation amount just needs to be calculated (monitored).

When the voltage value of the electrical storage device becomes higher than the predetermined voltage value and then becomes lower than or equal to the predetermined voltage value and the duration of the voltage value lower than or equal to the predetermined voltage value is longer than or equal to the predetermined time, it is not required to calculate the heat generation amount. When there is a period during which the heat generation amount is not calculated, it is possible to reduce a load resulting from calculation of the heat generation amount. In the above aspect, the controller may be configured to set the calculated heat generation amount to zero when the voltage value becomes higher than the predetermined voltage value and then becomes lower than or equal to the predetermined voltage value and a duration of the voltage value lower than or equal to the predetermined voltage value is longer than or equal to a predetermined time. When the heat generation amount is set to zero, the heat generation amount may be calculated with reference to zero when the voltage value of the electrical storage device becomes higher than the predetermined voltage value again.

Another aspect of the invention provides an electrical storage system. The electrical storage system includes an electrical storage device, a voltage sensor and a controller. The voltage sensor is configured to detect a voltage value of the electrical storage device. The controller is configured to calculate a heat generation amount of the electrical storage device in a period during which the voltage value changes from a state where the voltage value falls within a first region to a state where the voltage value falls within a second region and a duration of the voltage value that falls within the second region reaches a predetermined time. The first region includes the voltage value higher than a predetermined voltage value. The second region includes the voltage value lower than the predetermined voltage value. The controller is configured to determine that the electrical storage device is in an abnormal state, when the heat generation amount is larger than a predetermined amount. The predetermined voltage value is used to identify an overcharged state of the electrical storage device.

In the above aspect, the controller may be configured to set the heat generation amount of the electrical storage device to zero, when the duration of the voltage value that falls within the second region is longer than or equal to the predetermined time.

The electrical storage device may further include a current sensor. The current sensor may be configured to detect a current value of the electrical storage device. The controller may be configured to calculate the heat generation amount on the basis of the current value of the electrical storage device.

When the electrical storage device is in the abnormal state, it is possible to reduce an allowable charge power value or an allowable discharge power value. The allowable charge power value is an upper limit power value at or below which charging of the electrical storage device is allowed. The allowable discharge power value is an upper limit power value at or below which discharging of the electrical storage device is allowed. By reducing the allowable charge power value or the allowable discharge power value, it is possible to reduce the current value of the electrical storage device. Therefore, it is possible to suppress heating of the electrical storage device.

On the other hand, when the electrical storage device is in the abnormal state, it is possible not to charge or discharge the electrical storage device. In this case, it is possible to interrupt connection of the electrical storage device with a load. Specifically, it is possible to turn off a relay for connecting the electrical storage device with the load. When the electrical storage device is not charged or discharged, no current flows through the electrical storage device, so it is possible to prevent heating of the electrical storage device resulting from energization.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
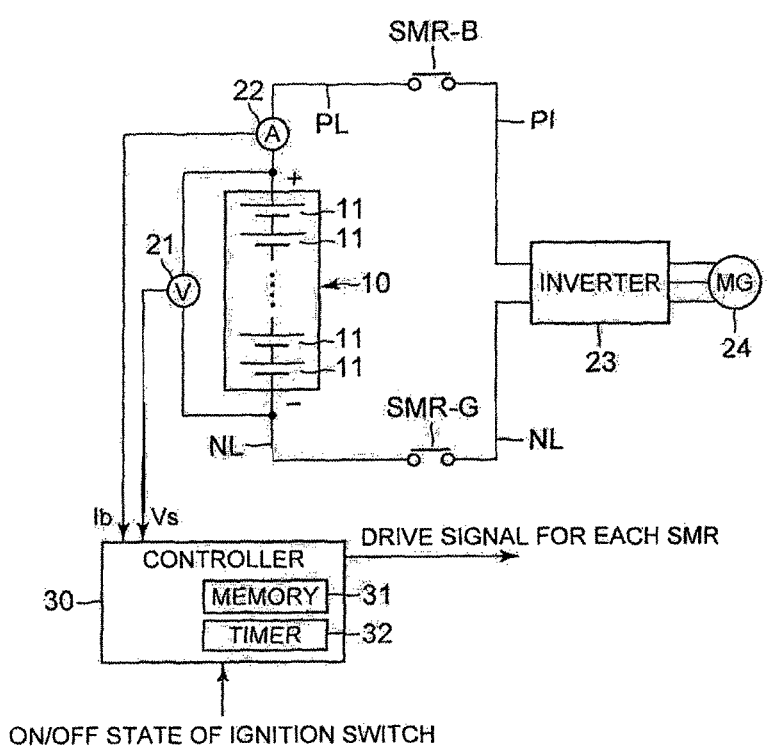
FIG. 1 is a view that shows the configuration of a battery system.

FIG. 1 is a view that shows the configuration of a battery system according to the embodiment (which corresponds to an electrical storage system according to the invention). The battery system shown in FIG. 1 is mounted on a vehicle. The vehicle is, for example, a hybrid vehicle (HV) or an electric vehicle (EV). The HV includes another power source in addition to a battery pack 10 as a power source for propelling the vehicle. The other power source is an engine or a fuel cell. The EV includes only the battery pack 10 as the power source for propelling the vehicle.

In the present embodiment, the battery pack 10 is mounted on the vehicle; however, the battery pack 10 is not limited to this arrangement. That is, as long as a system that is able to charge or discharge the battery pack 10, the invention is applicable.

The battery pack (which corresponds to an electrical storage device according to the invention) 10 includes a plurality of serially connected single cells 11. A secondary battery, such as a nickel-metal hydride battery and a lithium ion battery, may be used as each single cell 11. Instead of the secondary battery, an electric double layer capacitor may be used. The number of the single cells 11 may be set as needed on the basis of a required output, or the like, of the battery pack 10. The battery pack 10 may include a plurality of the single cells 11 that are connected in parallel with each other.

A voltage sensor 21 detects the voltage value Vs of the battery pack 10, and outputs the detected result to a controller 30. A current sensor 22 detects the current value Ib of the battery pack 10, and outputs the detected result to the controller 30. In the present embodiment, the current value Ib at the time when the battery pack 10 is discharged is defined as a positive value. The current value Ib at the time when the battery pack 10 is charged is defined as a negative value.

The controller 30 includes a memory 31 and a timer 32. The memory 31 stores various pieces of information, which are used by the controller 30 to execute a predetermined process (particularly, a process described in the present embodiment). The timer 32 is used to measure a time. In the present embodiment, the memory 31 and the timer 32 are incorporated in the controller 30; instead, at least one of the memory 31 or the timer 32 may be provided outside the controller 30.

A positive electrode line PL is connected to the positive electrode terminal of the battery pack 10. A negative electrode line NL is connected to the negative electrode terminal of the battery pack 10. A system main relay SMR-B is provided in the positive electrode line PL. A system main relay SMR-G is provided in the negative electrode line NL. The system main relays SMR-B, SMR-G each switch between an on state and an off state upon reception of a drive signal from the controller 30.

Information about the on/off state of an ignition switch is input to the controller 30. When the ignition switch switches from the off state to the on state, the controller 30 outputs drive signals for switching the system main relays SMR-B, SMR-G into the on state. When the ignition switch switches from the on state to the off state, the controller 30 outputs drive signals for switching the system main relays SMR-B, SMR-G into the off state.

The battery pack 10 is connected to an inverter 23 via the positive electrode line PL and the negative electrode line NL. When the system main relays SMR-B, SMR-G are in the on state, the battery pack 10 is connected to the inverter 23, and the battery system shown in FIG. 1 enters an activated state (ready-on state). When the system main relays SMR-B, SMR-G are in the off state, connection of the battery pack 10 with the inverter 23 is interrupted, and the battery system shown in FIG. 1 enters a stopped state (ready-off state).

The inverter 23 converts direct-current power, output from the battery pack 10, to alternating-current power, and outputs the alternating-current power to a motor generator (MG) 24. The motor generator 24 generates kinetic energy (power) for propelling the vehicle upon reception of the alternating-current power output from the inverter 23. The kinetic energy generated by the motor generator 24 is transmitted to wheels, thus causing the vehicle to travel.

When the vehicle is decelerated or the vehicle is stopped, the motor generator 24 converts kinetic energy, generated during braking of the vehicle, to electric energy (alternating-current power). The inverter 23 converts alternating-current power, generated by the motor generator 24, to direct-current power, and outputs the direct-current power to the battery pack 10. Thus, the battery pack 10 stores regenerative electric power.

In the battery system according to the present embodiment, a step-up circuit may be provided in a current path between the battery pack 10 and the inverter 23. The step-up circuit is able to step up the output voltage of the battery pack 10 and then to output the stepped-up electric power to the inverter 23. The step-up circuit is able to step down the output voltage of the inverter 23 and then to output the stepped-down electric power to the battery pack 10.

In the present embodiment, it is determined whether the battery pack 10 is in an abnormal state resulting from heating. When the battery pack 10 is in an overcharged state, the battery pack 10 is easy to generate heat. A predetermined voltage value $Vs\_th$ may be set as a threshold for determining the overcharged state of the battery pack 10. Thus, when the voltage value $Vs$ of the battery pack 10 is higher than the predetermined voltage value $Vs\_th$, it may be determined that the battery pack 10 is in the overcharged state. When the voltage value $Vs$ is higher than the predetermined voltage value $Vs\_th$, it may be determined that the battery pack 10 is in an easily heated state.

Even when the voltage value $Vs$ becomes lower than or equal to the predetermined voltage value $Vs\_th$ after the voltage value $Vs$ becomes higher than the predetermined voltage value $Vs\_th$, the battery pack 10 is still in the easily heated state. Unless the duration of the voltage value $Vs$ lower than or equal to the predetermined voltage value $Vs\_th$ reaches a certain time, the battery pack 10 is likely to remain in the easily heated state. In order to determine whether the battery pack 10 is in the abnormal state resulting from heating, it is required to monitor the heat generation amount of the battery pack 10 while the battery pack 10 is in the easily heated state.

In the present embodiment, when the voltage value $Vs$ becomes higher than the predetermined voltage value $Vs\_th$, the heat generation amount of the battery pack 10 is monitored (calculated). When the heat generation amount of the battery pack 10 is larger than a predetermined amount, it is determined that the battery pack 10 is in the abnormal state.

On the other hand, even when the voltage value $Vs$ becomes higher than the predetermined voltage value $Vs\_th$, but after that, if the voltage value $Vs$ becomes lower than or equal to the predetermined voltage value $Vs\_th$, as the duration of the voltage value $Vs$ lower than or equal to the predetermined voltage value $Vs\_th$ extends, the battery pack 10 becomes more likely to exit from the easily heated state. When the battery pack 10 has exited from the easily heated state, the heat generation amount of the battery pack 10 does not need to be monitored.

In the present embodiment, monitoring of the heat generation amount is stopped on the basis of the duration $t\_off$ of the voltage value $Vs$ lower than or equal to the predetermined voltage value $Vs\_th$. However, even after monitoring of the heat generation amount is stopped, when the voltage value $Vs$ becomes higher than the predetermined voltage value $Vs\_th$, monitoring of the heat generation amount is resumed.

The duration $t\_off$ is a duration of the voltage value $Vs$ lower than or equal to the predetermined voltage value $Vs\_th$, and may be measured by the timer 32. When a predetermined time $t\_off\_th$ required until the easily heated state of the battery pack 10 is eliminated is set in advance, it may be determined whether the battery pack 10 has exited from the easily heated state by comparing the duration $t\_off$ with the predetermined time $t\_off\_th$.

Specifically, when the duration $t\_off$ is longer than or equal to the predetermined time $t\_off\_th$, it may be determined that the battery pack 10 has exited from the easily heated state. In this case, monitoring of the heat generation amount may be stopped. On the other hand, when the duration $t\_off$ is shorter than the predetermined time $t\_off\_th$, it may be determined that the battery pack 10 remains in the easily heated state. In this case, monitoring of the heat generation amount may be continued.

Figure 2:
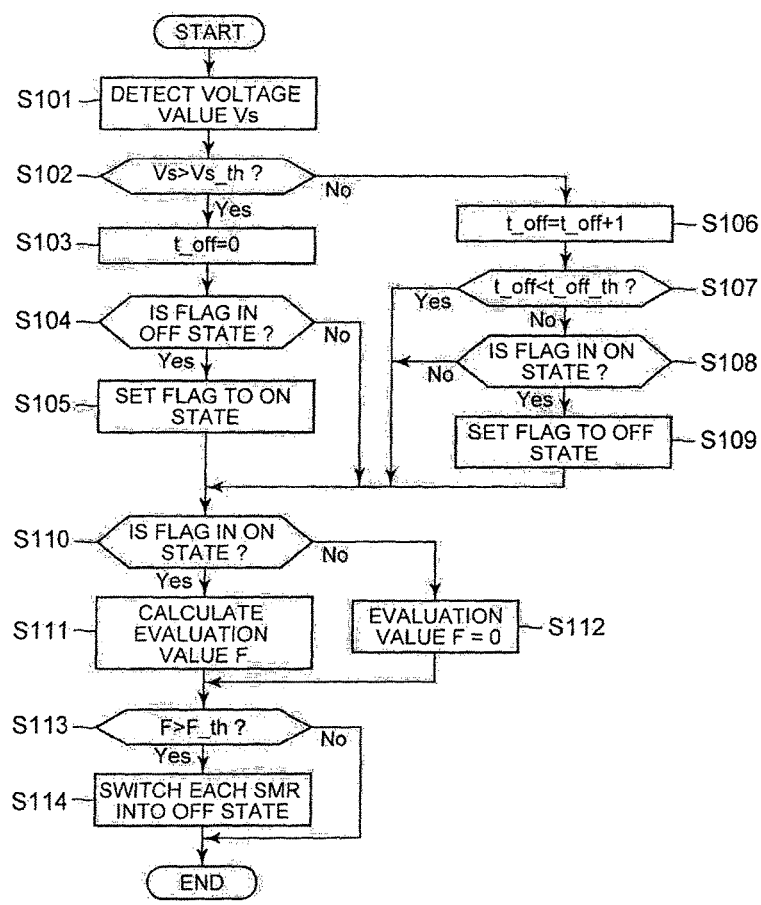
FIG. 2 is a flowchart that illustrates the process of determining whether a battery pack is in an abnormal state related to heating.

The process of determining whether the battery pack 10 is in the abnormal state resulting from heating will be described with reference to the flowchart shown in FIG. 2. The process shown in FIG. 2 is repeated at predetermined intervals, and is executed by the controller 30. After the battery system enters an activated state, the process shown in FIG. 2 is started. When the process shown in FIG. 2 is started, the duration $t\_off$ is 0, and a flag (described later) is in an off state.

In step S101, the controller 30 detects the voltage value $Vs$ of the battery pack 10 with the use of the voltage sensor 21. In step S102, the controller 30 determines whether the voltage value $Vs$ detected in the process of step S101 is higher than the predetermined voltage value $Vs\_th$. The predetermined voltage value $Vs\_th$ is a voltage value for determining whether the battery pack 10 is in the overcharged state as described above. Information that identifies the predetermined voltage value $Vs\_th$ may be stored in the memory 31.

When the voltage value $Vs$ is higher than the predetermined voltage value $Vs\_th$, the controller 30 determines that the battery pack 10 is in the overcharged state, and executes the process of step S103. On the other hand, when the voltage value $Vs$ is lower than or equal to the predetermined voltage value Vs_th, the controller 30 determines that the battery pack 10 is not in the overcharged state, and executes the process of step S106.

In step S103, the controller 30 sets the duration t_off to 0. In step S104, the controller 30 determines whether the flag is in the off state. The flag is used to determine whether to calculate an evaluation value F (described later). That is, the evaluation value F is calculated when the flag is in an on state, whereas the evaluation value F is not calculated when the flag is in the off state. The setting (on/off state) of the flag may be stored in the memory 31.

When the flag is in the off state in the process of step S104, the controller 30 sets the flag to the on state in step S105. On the other hand, when the flag is in the on state in the process of step S104, the controller 30 executes the process of step S110.

When the process proceeds from step S102 to step S106, the controller 30 counts up the duration t_off in step S106. In step S107, the controller 30 determines whether the duration t_off obtained in the process of step S106 is shorter than the predetermined time t_off_th. Information that identifies the predetermined time t_off_th may be stored in the memory 31.

When the duration t_off is shorter than the predetermined time t_off_th, the controller 30 executes the process of step S110. On the other hand, when the duration t_off is longer than or equal to the predetermined time t_off_th, the controller 30 determines in step S108 whether the flag is in the on state. When the flag is in the on state, the controller 30 sets the flag to the off state in step S109. On the other hand, when the flag is in the off state in the process of step S108, the controller. 30 executes the process of step S110.

In step S110, the controller 30 determines whether the flag is in the on state. When the flag is in the on state, the controller 30 calculates the evaluation value F in step S111. On the other hand, when the flag is in the off state, the controller 30 sets the evaluation value F to 0 in step S112. The evaluation value F is a value that defines the heat generation amount of the battery pack 10. Because the heat generation amount is proportional to the square of the current value Ib, the evaluation value F may be expressed as a function of the current value Ib.

The evaluation value F just needs to be able to be calculated on the basis of the current value Ib, and a method of calculating the evaluation value F may be determined as needed. For example, the evaluation value F may be calculated on the basis of the following mathematical expression (1).

$$F(n) = \frac{(K-1)F(n-1) + |Ib(n)|^2}{K} \quad (1)$$

In the above mathematical expression (1), F(n) is a present evaluation value F, and F(n−1) is a last evaluation value F. K is a constant, and is a value larger than 0 and smaller than 1. Within the range of 0 to 1, the constant K may be set as needed. Information that identifies the constant K may be stored in the memory 31. Ib(n) is a present current value Ib. Each time the current value Ib(n) is detected, the evaluation value F(n) is calculated.

Because the constant K is a value within the range of 0 to 1, the value of "(K−1)F(n−1)" is a negative value. That is, the value of "(K−1)F(n−1)" indicates a heat radiation amount resulting from emission of heat of the battery pack 10 to the outside. In the above-described mathematical expression (1), the square of the absolute value of the current value Ib(n) is calculated. This value indicates the heat generation amount (heat generation amount) resulting from passage of current through the battery pack 10. In this way, in consideration of the heat radiation amount and the heat generation amount, the present heat generation amount of the battery pack 10 may be acquired.

In step S113, the controller 30 determines whether the evaluation value F is larger than a predetermined value (which corresponds to a predetermined amount according to the invention) F_th. The predetermined value F_th is a value related to the evaluation value F, and is a value for defining a limit of a heated state of the battery pack 10. The predetermined value F_th is a value larger than 0, and is set in advance. Information that identifies the predetermined value F_th may be stored in the memory 31.

When the evaluation value F is smaller than or equal to the predetermined value F_th, the controller 30 ends the process shown in FIG. 2. On the other hand, when the evaluation value F is larger than the predetermined value F_th, the controller 30 determines that the battery pack 10 is in the abnormal state. In step S114, the controller 30 outputs drive signals for switching the system main relays SMR-B, SMR-G into the off state. The system main relays SMR-B, SMR-G each switch from the on state to the off state upon reception of the drive signal from the controller 30.

Thus, the battery pack 10 is not charged or discharged. When the battery pack 10 is not charged or discharged, it is possible to prevent heating resulting from passage of current through the battery pack 10, so it is possible to suppress an excessive increase in the temperature of the battery pack 10. When the vehicle is the above-described HV, the vehicle is allowed to travel to a retreat location by using the power of the engine.

In the above-described mathematical expression (1), the constant K is set at a constant value irrespective of whether the battery pack 10 is charged or discharged. The constant K may be changed between when the battery pack 10 is charged and when the battery pack 10 is discharged. Specifically, the constant K that is set at the time when the battery pack 10 is charged may be larger than the constant K that is set at the time when the battery pack 10 is discharged. In this case, even when the current value (absolute value) Ib during charging and the current value (absolute value) Ib during discharging are equal to each other, the evaluation value F at the time when the battery pack 10 is charged is larger than the evaluation value F at the time when the battery pack 10 is discharged.

By calculating the evaluation value F in this way, the evaluation value F is more easy to increase when the battery pack 10 is charged. As described above, after the voltage value Vs becomes higher than the predetermined voltage value Vs_th and it is determined that the battery pack 10 is in the overcharged state, the battery pack 10 is easy to be heated. When the battery pack 10 is charged after the voltage value Vs becomes higher than the predetermined voltage value Vs_th, the voltage value Vs tends to remain higher than the predetermined voltage value Vs_th or the voltage value Vs tends to become higher than the predetermined voltage value Vs_th. Thus, the battery pack 10 becomes further easy to be heated.

As described above, by setting the evaluation value F during charging and the evaluation value F during discharging such that the evaluation value F during charging is larger than the evaluation value F during discharging, it is possible to suppress underestimation of a heat generation amount that is acquired from the evaluation value F during charging of the battery pack 10. By causing the evaluation value F to be more easy to increase during charging, it is possible to early determine that the battery pack 10 is in the abnormal state.

In the process shown in FIG. 2, the flag is set to the off state when the duration t_off becomes longer than or equal to the predetermined time t_off_th, and the evaluation value F is set to 0. However, the process is not limited to this configuration. Specifically, after the voltage value Vs becomes higher than the predetermined voltage value Vs_th, the evaluation value F may be continuously calculated. That is, irrespective of whether the duration t_off is longer than or equal to the predetermined time t_off_th, the evaluation value F may be continuously calculated.

When the voltage value Vs becomes higher than the predetermined voltage value Vs_th, the battery pack 10 enters the easily heated state. Even when the voltage value Vs becomes lower than or equal to the predetermined voltage value Vs_th, the battery pack 10 remains in the easily heated state. Therefore, when the battery pack 10 enters the easily heated state, the heat generation amount of the battery pack 10 may be continuously monitored. That is, after the voltage value Vs becomes higher than the predetermined voltage value Vs_th, the evaluation value F may be continuously calculated.

Specifically, in the process of step S102 shown in FIG. 2, the process of step S101 may be repeated while the voltage value Vs is lower than or equal to the predetermined voltage value Vs_th. On the other hand, when the voltage value Vs becomes higher than the predetermined voltage value Vs_th, the process of step S111 may be executed. In the process of step S111, after calculation of the evaluation value F is started, calculation of the evaluation value F is continued. That is, in the process of step S113, while the evaluation value F is lower than or equal to the predetermined value F_th, the process of step S111 is repeated.

As described above, when the duration t_off becomes longer than or equal to the predetermined time t_off_th, the battery pack 10 has exited from the easily heated state. Therefore, in terms of determining whether the battery pack 10 is in the abnormal state related to heating, the evaluation value F does not need to be calculated. As in the case of the present embodiment, when calculation of the evaluation value F is stopped by setting the evaluation value F to 0, it is possible to reduce an opportunity of executing the process of calculating the evaluation value F as compared to the case where the evaluation value F is continuously calculated. Accordingly, it is possible to reduce a load at the time when the controller 30 calculates the evaluation value F.

In the process shown in FIG. 2, when the evaluation value F is larger than the predetermined value F_th, the system main relays SMR-B, SMR-G are switched into the off state; however, the process is not limited to this configuration. Specifically, when the evaluation value F is larger than the predetermined value F_th, an allowable charge power value Win and an allowable discharge power value Wout may be reduced. The allowable charge power value Win is an upper limit power value at or below which charging of the battery pack 10 is allowed. The allowable discharge power value Wout is an upper limit power value at or below which discharging of the battery pack 10 is allowed.

When the battery pack 10 is charged, charging is controlled so that electric power during charging does not exceed the allowable charge power value Win. When the battery pack 10 is discharged, discharging is controlled so that electric power during discharging does not exceed the allowable discharge power value Wout.

When charging of the battery pack 10 is controlled, the allowable charge power value Win is set as a reference value. Reducing the allowable charge power value Win means reducing the allowable charge power value (absolute value) Win as the reference value. As described above, because the current value Ib during charging is a negative value, the allowable charge power value Win is also a negative value. Therefore, when the allowable charge power value Win is reduced, the allowable charge power value (absolute value) Win is reduced. The allowable charge power value Win as the reference value is calculated from the temperature and state of charge (SOC) of the battery pack 10 as in the case of the existing art. The SOC is the ratio of a level of charge to a full charge capacity.

When discharging of the battery pack 10 is controlled, the allowable discharge power value Wout is set as a reference value. Reducing the allowable discharge power value Wout means reducing the allowable discharge power value Wout as the reference value. The allowable discharge power value Wout as the reference value is calculated from the temperature and state of charge (SOC) of the battery pack 10 as in the case of the existing art.

Reducing the allowable charge power value Win also includes setting the allowable charge power value Win to 0 [kW]. When the allowable charge power value Win is 0 [kW], the battery pack 10 is not charged. Reducing the allowable discharge power value Wout also includes setting the allowable discharge power value Wout to 0 [kW]. When the allowable discharge power value Wout is 0 [kW], the battery pack 10 is not discharged.

By reducing the allowable charge power value Win or the allowable discharge power value Wout, it is possible to reduce the current value Ib of the battery pack 10, so it is possible to suppress heating of the battery pack 10 resulting from energization. When the predetermined value F_th is set to a value smaller than a value corresponding to the limit of the heated state, it is possible to suppress reaching of the battery pack 10 to the limit of the heated state by reducing the allowable charge power value Win or the allowable discharge power value Wout even after the evaluation value F becomes larger than the predetermined value F_th.

An amount by which the allowable charge power value Win or the allowable discharge power value Wout is reduced may be set as needed. For example, as a difference between the evaluation value F and the predetermined value F_th increases, it is possible to increase the amount by which the allowable charge power value Win or the allowable discharge power value Wout is reduced. It is also possible to set a fixed value for the amount by which the allowable charge power value Win or the allowable discharge power value Wout is reduced.

On the other hand, when the evaluation value F is smaller than or equal to the predetermined value F_th, it is possible to reduce the allowable charge power value Win before the evaluation value F becomes larger than the predetermined value F_th. Thus, it is possible to suppress that the evaluation value F reaches the predetermined value F_th. For example, a predetermined value F_th1 smaller than the predetermined value F_th is set in advance, and, when the evaluation value F becomes larger than the predetermined value F_th1, the allowable charge power value Win may be reduced.

Figure 3:
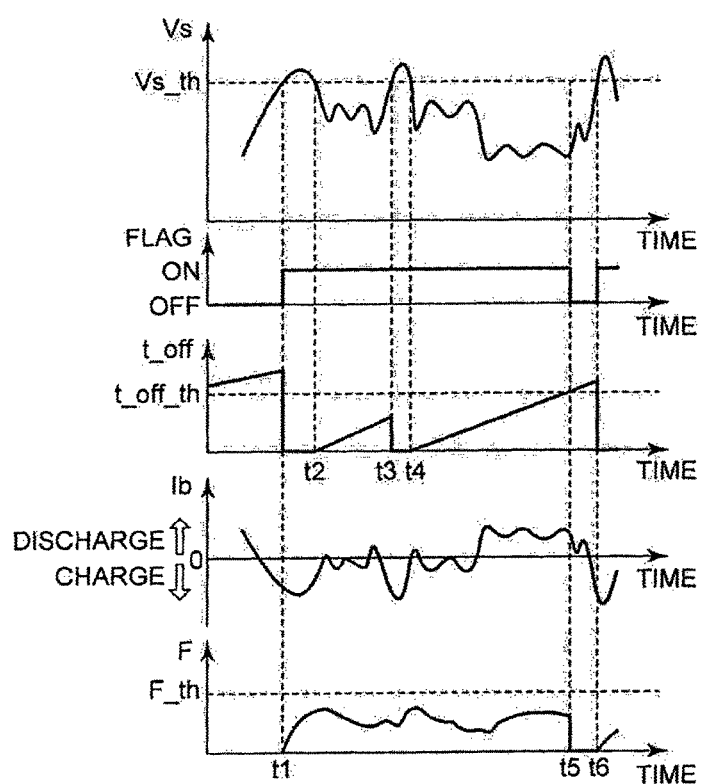
FIG. 3 is a timing chart that shows changes in voltage value, flag, duration, current value and evaluation value.

FIG. 3 is a timing chart (one example) that shows the behaviors of the voltage value Vs, setting of the flag, duration t_off, current value Ib and evaluation value F when the process shown in FIG. 2 is executed. In FIG. 3, the ordinate axes respectively represent voltage value Vs, setting of the flag, duration t_off, current value Ib and evaluation value F. The abscissa axis of FIG. 3 represents time.

When the voltage value Vs becomes higher than the predetermined voltage value Vs_th at time t1, the duration t_off is set to 0, and the flag is set to the on state. In response to the on state of the flag, calculation of the evaluation value F is started. After calculation of the evaluation value F is started, the evaluation value F increases with the current value Ib. Because the voltage value Vs is higher than the predetermined voltage value Vs_th from time t1 to time t2, the duration t_off remains zero.

When the voltage value Vs becomes lower than or equal to the predetermined voltage value Vs_th at time t2, counting up of the duration t_off is started. Because the voltage value Vs is lower than or equal to the predetermined voltage value Vs_th from time t2 to time t3, the duration t_off extends. When the voltage value Vs becomes higher than the predetermined voltage value Vs_th at time t3, the duration t_off is set to zero.

Because the duration t_off has not reached the predetermined time t_off_th at time t3, the flag remains in the on state. Because the voltage value Vs is higher than the predetermined voltage value Vs_th from t3 to time t4, the duration t_off remains zero. When the voltage value Vs becomes lower than or equal to the predetermined voltage value Vs_th at time t4, counting up of the duration t_off is started.

Because the voltage value Vs is lower than or equal to the predetermined voltage value Vs_th after time t4, the duration t_off extends. When the duration t_off reaches the predetermined time t_off_th at time t5, the flag switches from the on state to the off state. In response to the off state of the flag, the evaluation value F is set to 0. By setting the evaluation value F to 0, when the voltage value Vs becomes higher than the predetermined voltage value Vs_th next time, it is possible to calculate the evaluation value F with reference to 0.

When the voltage value Vs becomes higher than the predetermined voltage value Vs_th at time t6, the duration t_off is set to 0, and the flag is set to the on state, as in the case of time t1. In response to the on state of the flag, calculation of the evaluation value F is started. The evaluation value F is calculated with reference to 0 at time t6. Although the evaluation value F has not increased beyond the predetermined value F_th in the example shown in FIG. 3, when the evaluation value F has increased beyond the predetermined value F_th, the system main relays SMR-B, SMR-G each switch from the on state to the off state.

In the present embodiment, the voltage value Vs of the battery pack 10 is compared with the predetermined voltage value Vs_th; however, a compared target is not limited to this configuration. Specifically, when the voltage value of each single cell 11 or each battery module is detected with the use of a voltage sensor, the voltage value Vb may be compared with a predetermined voltage value Vb_th. Each battery module is formed of a plurality of the serially connected single cells 11. The battery pack 10 is formed by serially connecting a plurality of the battery modules.

The predetermined voltage value Vb_th corresponds to the predetermined voltage value Vs_th. However, because the predetermined voltage value Vb_th is compared with the voltage value Vb lower than the voltage value Vs, the predetermined voltage value Vb_th is a value lower than the predetermined voltage value Vs_th.

The invention claimed is:

1. An electrical storage system comprising:
   an electrical storage device;
   a voltage sensor configured to detect a voltage value of the electrical storage device;
   a current sensor configured to detect a current value of the electrical storage device; and
   a controller configured to
      in response to the voltage value becoming higher than a predetermined voltage value, start calculation of a heat generation amount of the electrical storage device based on the current value, continue the calculation of the heat generation amount until the voltage value becomes lower than or equal to the predetermined voltage value and stays lower than or equal to the predetermined voltage value for a predetermined time, and stop the calculation of the heat generation amount after the predetermined time, and
      determine that the electrical storage device is in an abnormal state, when the calculated heat generation amount is larger than a predetermined amount, the predetermined voltage value being used to identify an overcharged state of the electrical storage device, the abnormal state being an abnormal state related to heating of the electrical storage device.

2. The electrical storage system according to claim 1, wherein
   the controller is configured to set the calculated heat generation amount to zero when the voltage value becomes higher than the predetermined voltage value and then becomes lower than or equal to the predetermined voltage value and a duration of the voltage value lower than or equal to the predetermined voltage value is longer than or equal to the predetermined time.

3. The electrical storage system according to claim 1, wherein the controller comprises:
   a timer that measures a duration during which the voltage value becomes lower than or equal to the predetermined voltage value and stays lower than or equal to the predetermined voltage value after the calculation of the heat generation amount is started, and
   a memory that stores the predetermined time, and
   wherein the controller is further configured to compare the measured duration with the stored predetermined voltage, and stop the calculation of the heat generation amount in response to the measured duration being longer than or equal to the predetermined time.

\* \* \* \* \*